Figure 16:
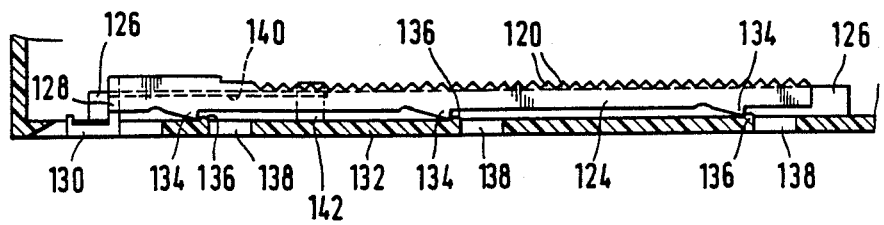

United States Patent [19]

Ackeret

[11] Patent Number: 4,970,813

[45] Date of Patent: Nov. 20, 1990

[54] PICTURE CHANGER

[75] Inventor: Peter Ackeret, Kusnacht, Switzerland

[73] Assignee: Licinvest AG, Chur, Switzerland

[21] Appl. No.: 223,062

[22] PCT Filed: Oct. 24, 1987

[86] PCT No.: PCT/EP87/00632

§ 371 Date: Jun. 15, 1988

§ 102(e) Date: Jun. 15, 1988

[87] PCT Pub. No.: WO88/03280

PCT Pub. Date: May 5, 1988

[30] Foreign Application Priority Data

Oct. 28, 1986 [DE] Fed. Rep. of Germany ....... 3636640

[51] Int. Cl.[5] .......................................... G03B 23/02
[52] U.S. Cl. ....................................... 40/511; 40/513
[58] Field of Search ................. 40/513, 511, 490, 508, 40/509, 375, 380, 381

[56] References Cited

U.S. PATENT DOCUMENTS 4,259,802  4/1981  Ackeret ........................... 40/490 X
4,376,348  3/1983  Ackeret ........................... 40/511 X
4,801,016  1/1989  Irrgeher ........................... 40/513 X

FOREIGN PATENT DOCUMENTS 2454112  11/1980  France .
WO86/03029  5/1986  PCT Int'l Appl. .
WO87/03971  7/1987  PCT Int'l Appl. .

Primary Examiner—James R. Brittain
Attorney, Agent, or Firm—Robert R. Jackson

[57] ABSTRACT

The picture changer comprises a housing with a window and a slider member, on the actuation of which a pile of pictures housed in the changer is cyclically rearranged. To simplify construction and give the change-over movement any easy action, the process of separating the individual picture, which takes place under strong spring bias, is restricted to a short partial travel. As the change-over movement continues, the individual sheet is stiffened in the conveying direction so that it holds the remainder of the pile at a distance from the separating gap and itself is held by stop members. The change-over function can be interrupted by displacing the separating gap.

149 Claims, 10 Drawing Sheets

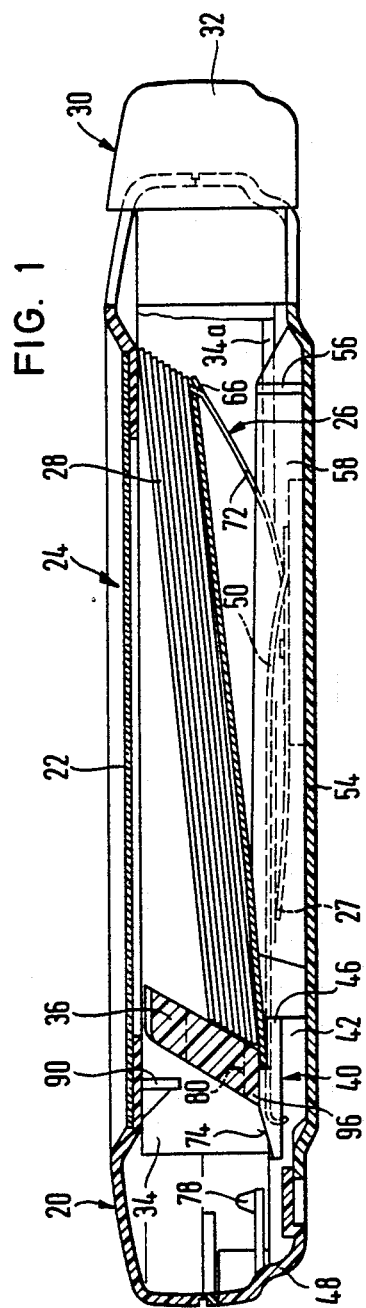
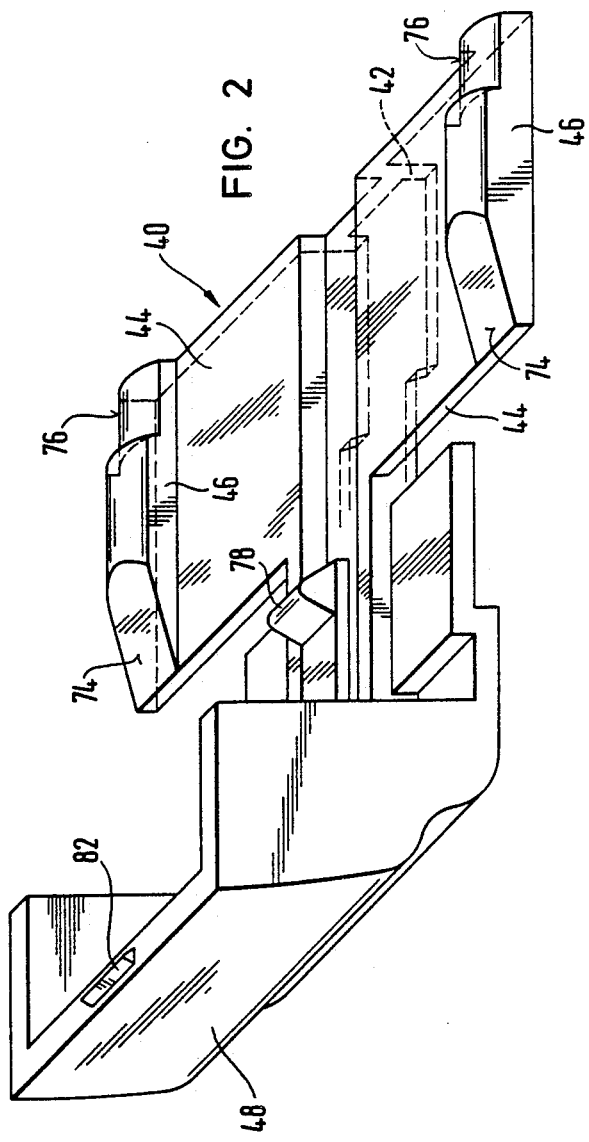
FIG. 1
FIG. 2

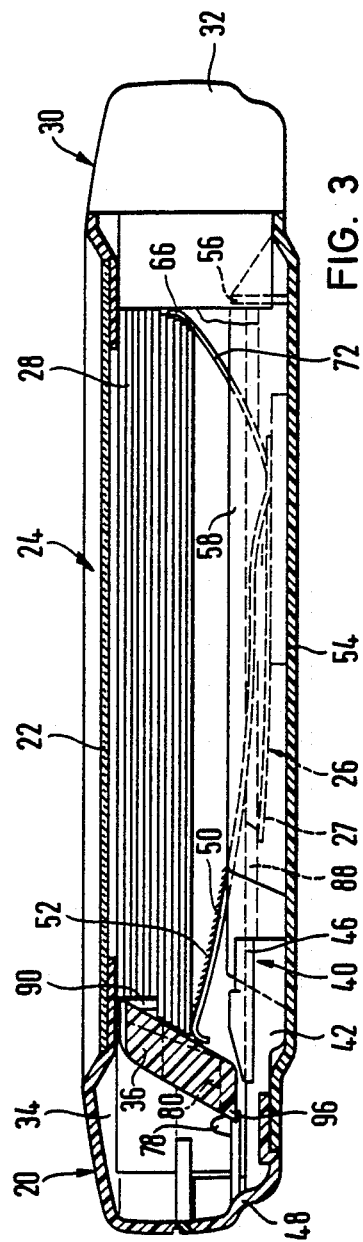
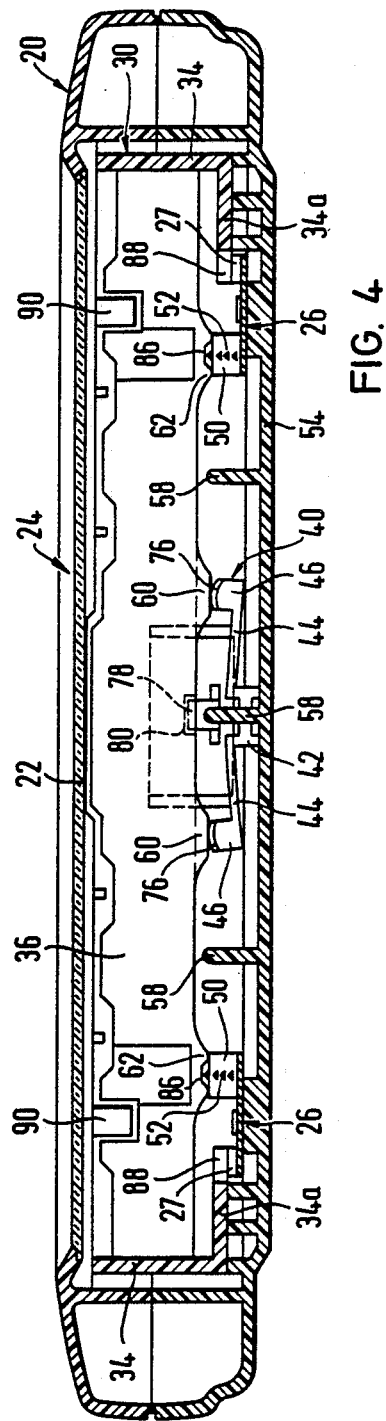

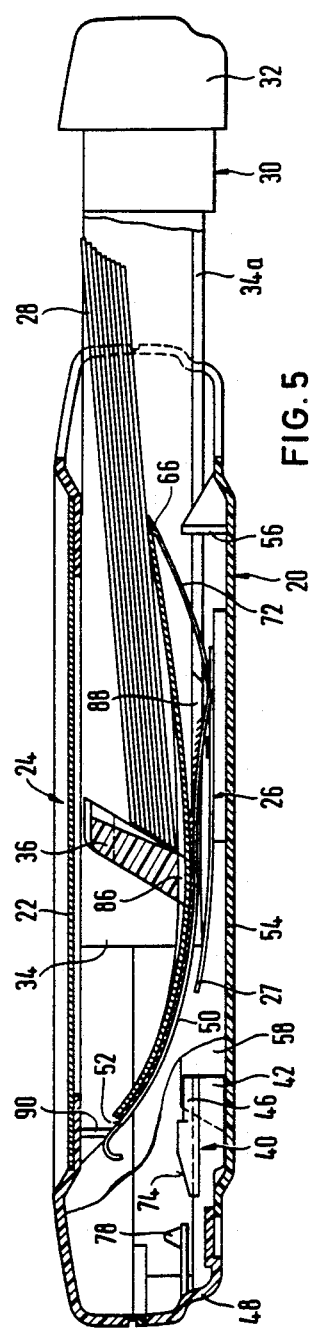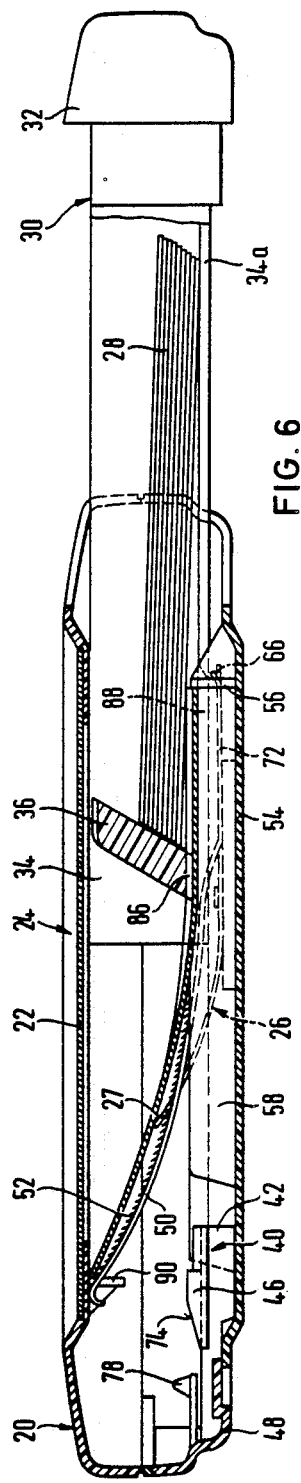

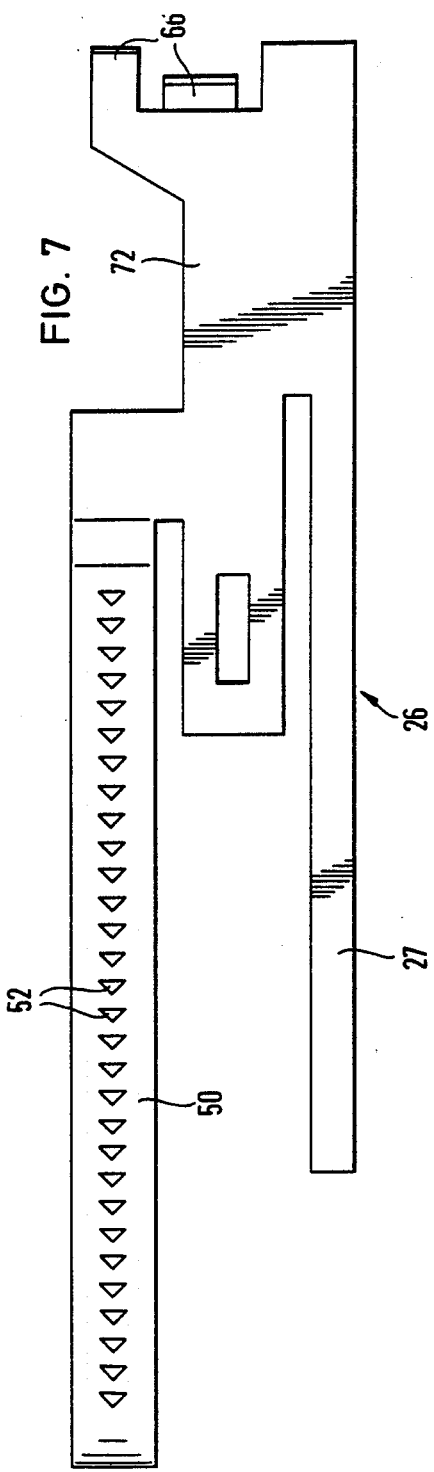
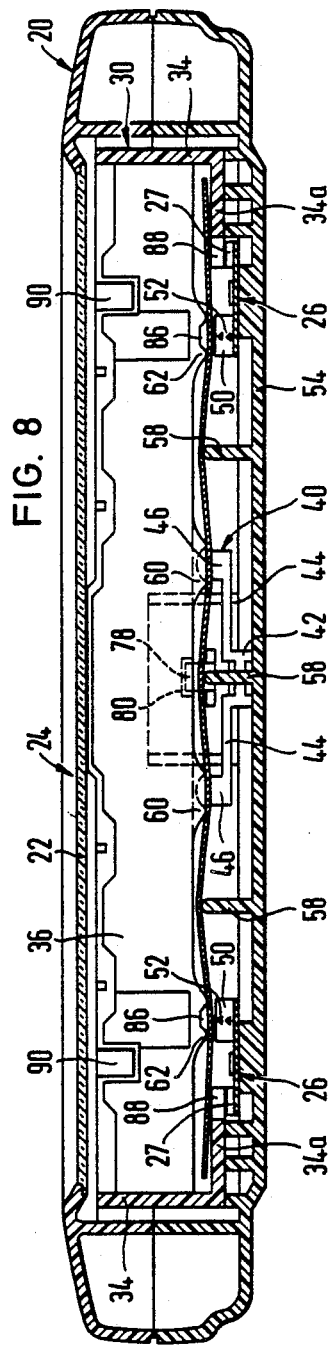
FIG. 7
FIG. 8
FIG. 9

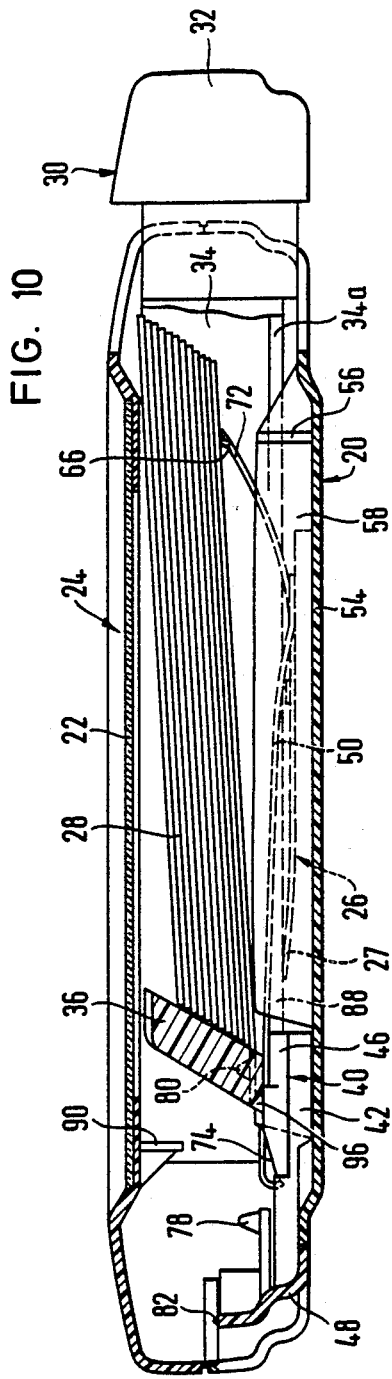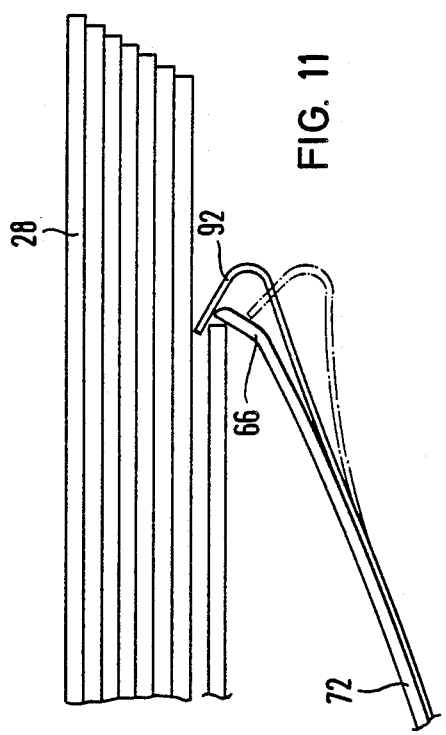

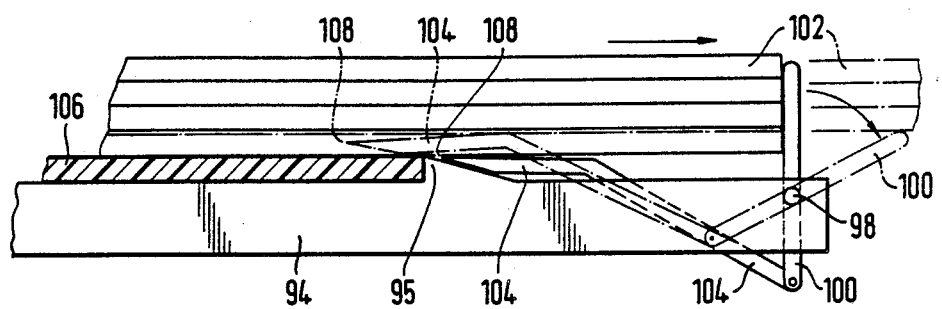
FIG. 12
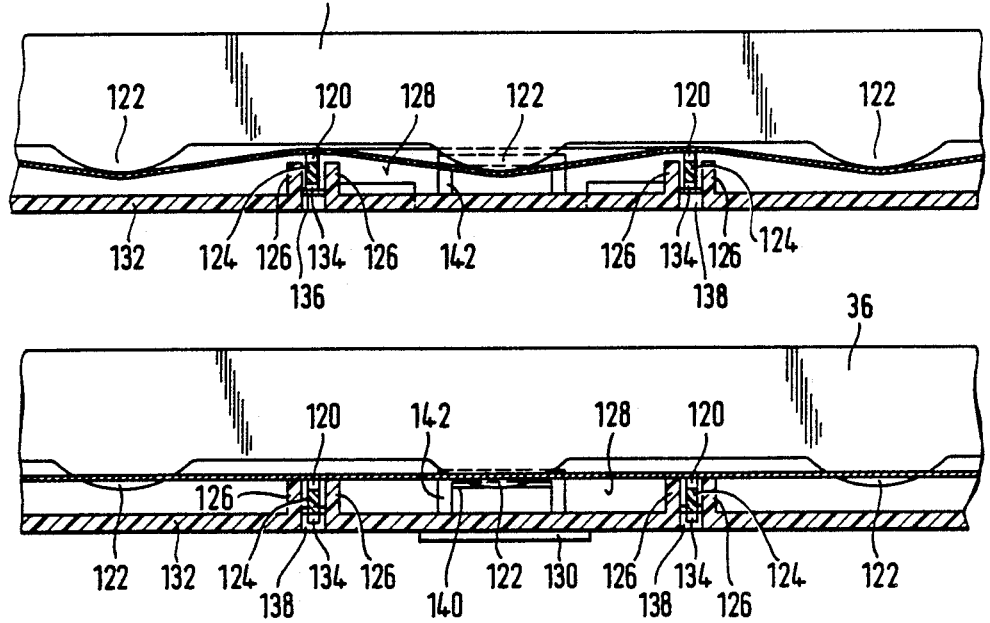
FIG. 13
FIG. 14

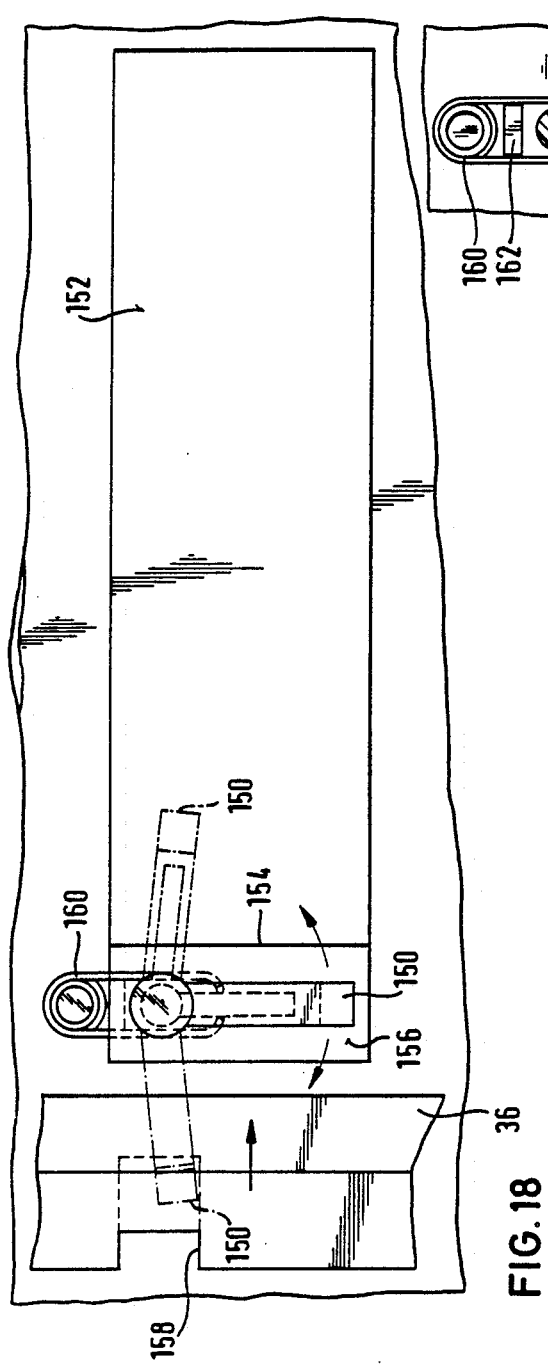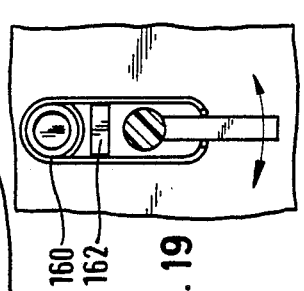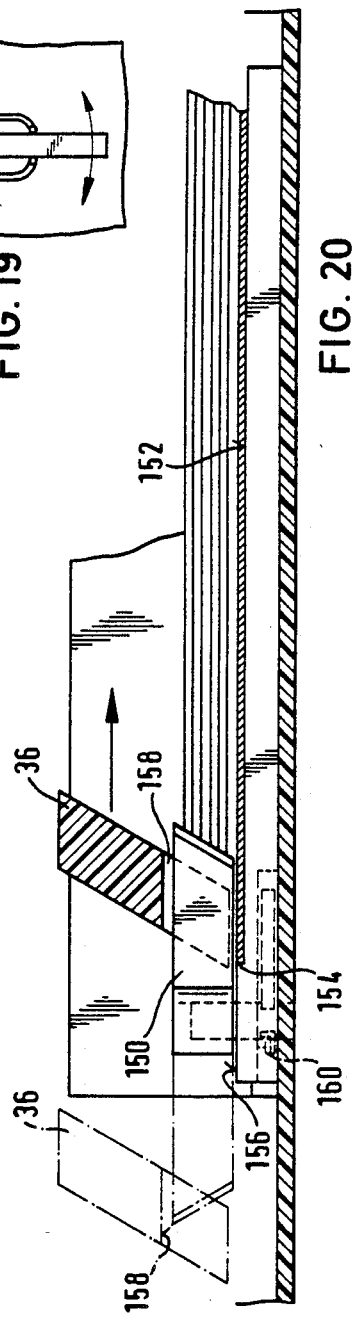

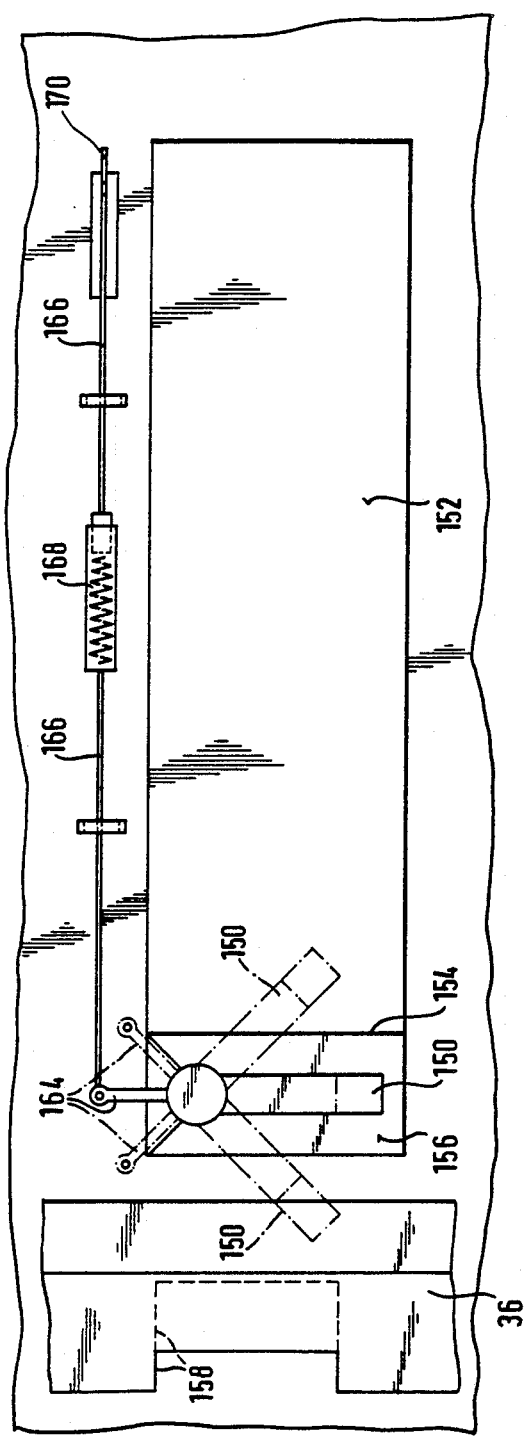
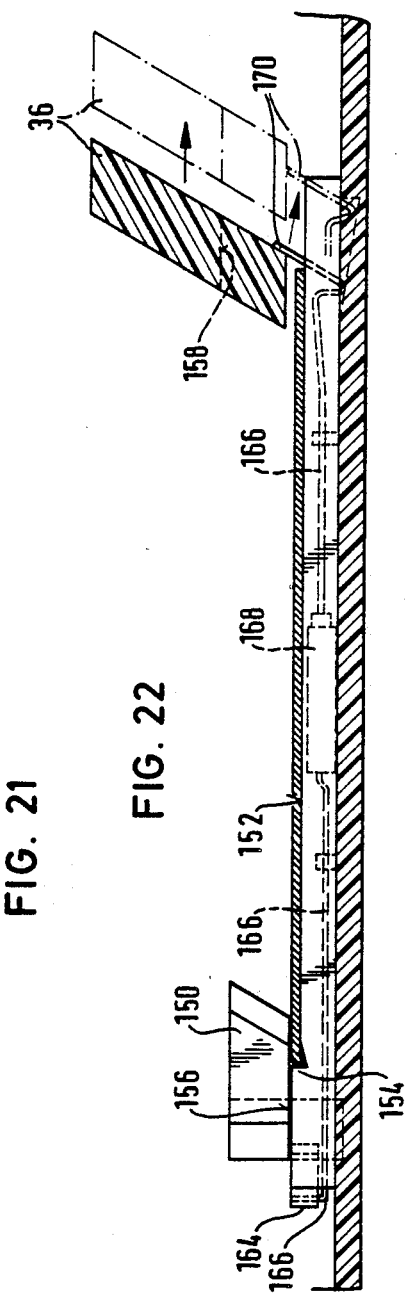
FIG. 21
FIG. 22

PICTURE CHANGER

The invention concerns a picture changer, as described and illustrated in the prior patent applications mentioned below: PCT/EP85/00608, PCT/EP85/00615.

The forces that have to be applied when separating an individual picture can be quite considerable, and because the individual parts of the picture changer cannot be manufactured or assembled without tolerance variations, the separating devices are held in active engagement by biassing springs. This spring bias ultimately acts between the housing frame part and the slider member frame part, increases the friction, and necessitates complicated measures to avoid wear and tear.

The invention is based on the problem of constructing a picture changer of this kind in such a manner that it acts easily, and can be manufactured economically with few individual parts.

The solution according to the invention will become apparent from the independent patent claims.

The first aspect of this invention relates to the fact that the separating force for detaching the individual picture from the remainder of the pile is applied only over a slight partial path of the slider member, namely at the start of the slider member withdrawal.

A further aspect of the invention relates to the fact that, over the further path of the slider member, the remainder of the pile is held at a distance from the picture through-gap of the separating device by a special deformation of the separated picture.

A further aspect of the invention relates to a novel combination of the separating means and a device which enables the change-over function to be interrupted.

A further aspect of the invention concerns the construction of retaining systems which hold the individual picture securely in one frame part and safeguard it against becoming twisted.

A first such system comprises a special embodiment of a system of pressure springs such that a part of the same simultaneously forms a part of such a retaining system. A second retaining system comprises stop members integrally moulded on one of the frame parts, the sheet being presented to these stop members in such a manner that it is unable to slip off them. A third retaining system comprises an element which is arranged in the first frame part, is provided with teeth and which can be displaced in the direction of movement of the frame parts between an active and an inactive position.

Finally, a further aspect of the invention concerns a modified construction of the separating means, in which a spring bias between the separating elements defining a through-gap is not absolutely necessary.

Examples of embodiments of the subject of the invention are described in detail hereinafter with reference to the accompanying drawings.

Figure 15:
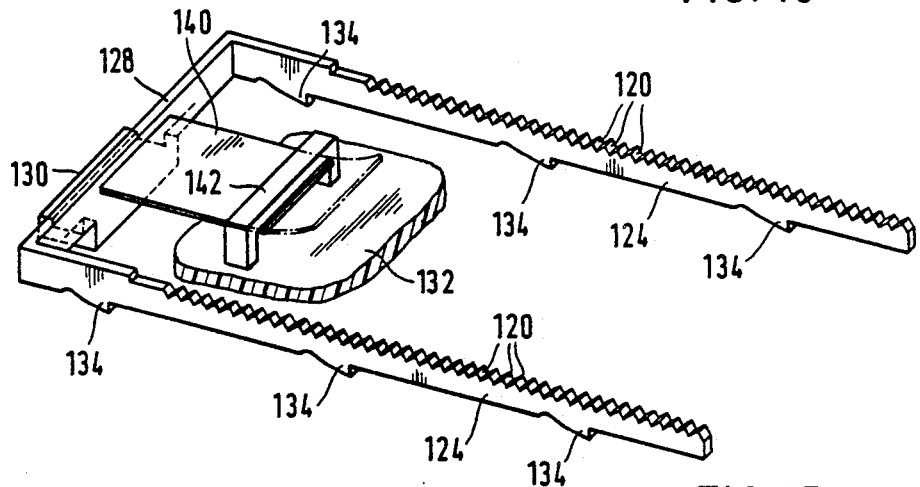
Figure 17:
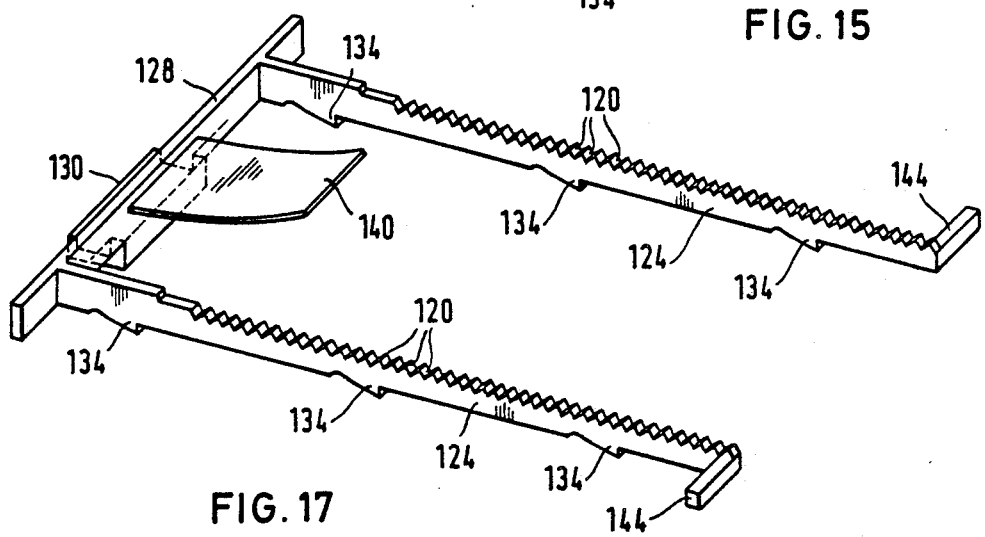
Figure 23:
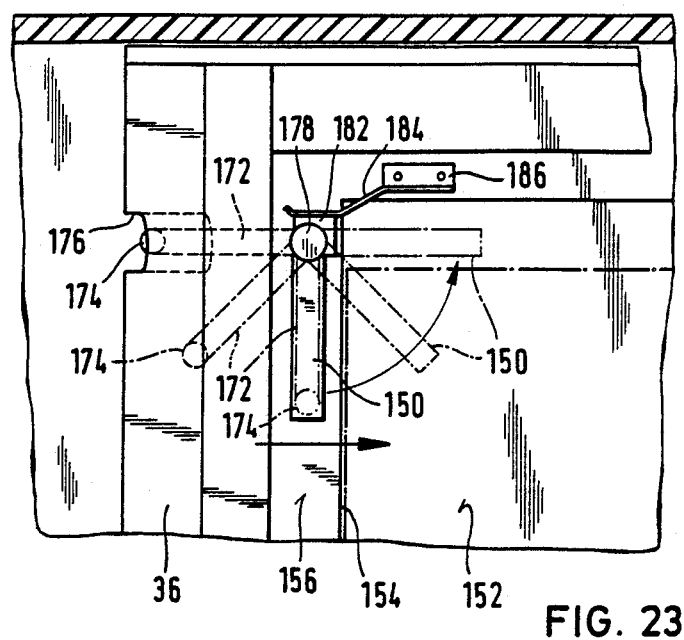
Figure 24:
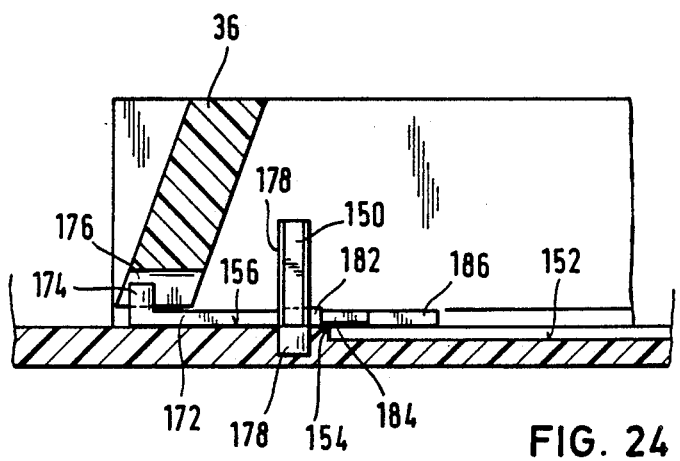

FIG. 1 shows a longitudinal section through a picture changer according to the invention after the start of the rearranging operation, FIG. 2 shows a perspective view of a component of the changer, FIG. 3 is a section analogous to FIG. 1, but in the closed position of the changer, FIG. 4 is a cross-section through the changer of FIG. 1 in the region of the separator bar, FIG. 5 shows a later phase of the rearranging operation in a view analogous to FIG. 1, FIG. 6 shows an analogous following phase, FIG. 7 is a plan view onto one of the two symmetrically arranged springs, shown pressed down flat, FIG. 8 shows, in a view similar to FIG. 4, a section in the separator region in the position of the frame parts shown in FIG. 6, FIG. 9 shows, schematically, and exaggeratedly, the effect of the picture deformation shown in FIG. 8, FIG. 10 shows, in a view similar to FIG. 1, the relative position of the components when the removal element is actuated, FIG. 11 shows schematically a variation of the retaining system for the individual sheet, FIG. 12 shows schematically a further modification of this system, FIG. 13 shows in partial cross-section the retaining functional elements of a further embodiment, FIG. 14 shows, in a view similar to FIG. 13, the functional elements in a different operating position, FIG. 15 shows one of the elements in a perspective view, FIG. 16 shows this element in side view together with its control means, FIG. 17 shows a perspective view, partially broken away, of a variation of FIG. 15, FIG. 18 shows in partial plan view a modified separating means, FIG. 19 shows one of the separating elements from below, FIG. 20 is the accompanying side view, FIG. 21 shows, analogously to FIG. 18, a further variation, FIG. 22 is a schematicized longitudinal section to FIG. 21, FIG. 23 shows, analogously to FIG. 18, a modified separating system, and FIG. 24 shows the two separating elements in partial section.

In the following description, the terms "sheet" and "picture" are used synonymously; it is obvious that each sheet carrying visual information is also a "picture".

In all the drawings the illustrations are substantially simplified and schematicized; as regards the details, the reader is advised to refer to the prior applications mentioned in the introduction.

The picture changer (or sheet changer) comprises a first frame part 20, hereinafter referred to as the housing, having a viewing window 24 preferably covered by a transparent pane 22. Opposite the viewing window, spring assemblies 26 are mounted on the floor of the housing 20. The free arms 50, 27 and 72 of the spring assemblies press the pile of pictures 28 towards the viewing window.

A second frame part can be displaced relative to the housing in a direction parallel to the plane of the viewing window. This second frame part is referred to hereinafter as the slider member 30. It comprises a front grippable end 32, two lateral side-pieces 34 with bottom strips 34a and an inner transverse wall 36 in the form of a separator bar. The springs 26 have access to the pictures between the side-pieces 34.

At the end of the housing 20 opposite the grippable end 32 there is arranged in the housing a first separating element 40 which cooperates with the separator bar 36 as the second separating element. The first separating element 40 comprises a support 42 from which spring arms 44 extend outwards on both sides (FIG. 4). At the free ends of the spring arms 44 there are arranged stepped portions 46, the top sides of which slope obliquely backwards. The first separating element 40 is in this case not stationary in the housing but can be displaced for a short distance (cf. FIG. 10) in the direction of movement of the slider member. For this purpose, an externally accessible button 48 is integrally moulded on the support 42. The first separating element consists of a plastics material that is not susceptible to cold flow, so that the resilient properties of the arms 44 are not impaired even if the slider member is not completely inserted in the housing.

FIG. 7 shows that the arm 50 of the spring assemblies 26, on its side facing towards the pile, has been treated in such a way that friction with respect to the material of the pictures is increased. This can be effected by coating it with a suitable material, by roughening it, or in some other way. In this embodiment, small teeth 52 have been pushed out in such a way that they extend in a direction opposite the withdrawal direction of the slider member and thereby hold a picture firmly but do not hinder the insertion of the slider member with the remainder of the pile.

On the housing floor 54, close to the housing opening through which the slider member moves, there is provided a picture stop member in the form of projections 56. Several ribs, three in this embodiment, denoted by the reference number 58, extend in the ejection direction of the slider member. On the underside of the separator bar 36 there are provided projections 60 on each side of the middle rib and projections 62 outside the outer ribs 58. As clear from FIG. 8, this results in a picture that lies between the separator and the ribs being deformed in a wave-like manner and thereby being stiffened in the longitudinal direction (i.e. in the withdrawal direction of the slider member).

The function of the changer is explained below:

FIG. 3 shows the initial position. The end of the pile nearest the separator is pressed by the spring arms 50 against the viewing window and the separator bar is located, viewed in the withdrawal direction of the slider member, behind the stepped portions 46, the spring arms 44 of which are unstressed. The spring arms 72 furthest away from the separator bar, which are provided with inclined hooks 66, likewise press the pile against the viewing window.

If the slider member is now pulled, a force is exerted by the separator bar on the picture edges facing it. Because the separator bar has an inclined face, this force has a component acting in the ejection direction and a component directed away from the window 22.

The effect on the pictures differs, depending on whether they are checked at their end furthest away from the separator bar by the inclined hooks 66 or on whether they are able to slide away unchecked over the inclined hooks. These last pictures are simply carried along by the separator bar. The pictures checked by the inclined hooks on the other hand slide with their edge facing the separator downwards along the inclined face thereof, whereupon the spring arms 50 are pressed away from the window.

The underside of the separator 36 runs onto the oblique faces 74 of the stepped portions and with the stepped portion defines a gap which is wider than one picture thickness but narrower than the thickness of two pictures. The spring bias exerted by the spring arms 44 (or a different biassing system between the housing and slider member) keeps the gap to size despite possible tolerances during this picture separating operation. The upper side of the stepped portions 46 is provided with a rounded portion 76 so that line contact with the separator and the picture respectively takes place, and even if there is any tilting the correct dimension of the step height, and thus of the gap width, remains unchanged.

The picture that is lowermost in the pile (that is to say, the picture furthest away from the window), checked by the inclined hooks 66, but not, however, the picture immediately next to it, fits with its other end edge into the gap. The force component of the separator effective in the ejection direction ultimately overcomes the checking force of the hooks 66 which, because of their inclined position, slide off all the picture edges, with the exception of that of the lowermost picture.

When the separator bar had slid over the stepped portions 46, there was a danger that the second lowermost or even more pictures would remain beneath the separator. In the known picture changers mentioned in the introduction this is countered by the fact that for the entire travel of the slider member the spring force keeps the height of the gap restricted to the thickness of one picture, which results in stiffness of operation and an expensive degree of complexity. According to the invention, a different solution is chosen here: the separated picture now lies between the separator and the ribs 58 and in doing so is bowed as shown in FIG. 8. One can see that rounded "waves") are formed inside the separator on which the pictures carried along with the slider member "ride". This is shown diagrammatically in FIG. 9. Because there is no force component acting on the pictures in the remainder of the pile which would cause a deformation similar to that of the separated picture, the edge of even the second lowermost picture nearest the separator is unable to "creep" beneath the separator bar. The ribs 58 and projections 60/62 engaging like combs with one another are effective preferably for the entire length of the withdrawal movement of the slider member.

It must be stressed that this wave-like deformation of the individual picture—which in the drawings is naturally illustrated in a somewhat exaggerated manner for the sake of clarity—is able to occur only if the edge of the picture was previously able to pass beneath the separator. This in turn is only possible if the positions of the inclined hooks, the stepped portions and the ribs are correctly coordinated with one another. Advantage is taken of this fact in order to be able to remove the complete pile using the slider member: if, in fact, this geometry is disturbed, no picture change can take place and in the embodiment the change-over function is thus "interrupted" in that the assembly comprising support 42, arms 44, stepped portions 46 and button 48 is displaced by a given degree in the withdrawal direction of the slider member (FIG. 10). The gap beneath the separator bar is in fact formed only when even the lowermost pictures have been released by the inclined hooks 66. The entire pile is supported by the ribs 58 and the slider member side pieces 34a, respectively, at a level that is above (i.e closer to the window 22) than the lower edge of the separator. If the slider member is then pulled, it transports the entire pile to the outside. On re-insertion, the assembly 42–48, as described below, is pushed back into its "change-over function position" again: the support 42 has an upwardly projecting lug 78 which, when the button 48 is pressed in manually, is positively guided or snaps resiliently into a complementary recess 80 in the separator, but upon withdrawal of the slider member snaps out again on account of the limited travel of the support 42, and when the slider member is pushed back by the separator running onto the stepped portion 46 or onto the lug 78, is pushed back until the change-over function position has been regained.

The assembly is, however, even during the change-over function, governed by a force in the withdrawal direction of the slider member exerted on it by the separator; to prevent a displacement of the assembly occurring unintentionally as a result thereof, the assembly is arrested in the change-over position and can be manually released when the entire pile is to be removed and the displacement is intended to be effected. For this purpose, there is provided a projection 82 which snaps into the opposite housing edge and can be disengaged from this by undergoing resilient deformation.

To return to the change-over function:

The picture separated from the pile is now held at its one edge by the stepped portions 46 and at its other edge by the inclined hooks 66. On further withdrawal of the slider member, the separator bar runs over the stepped portions 46, but the individual picture is not released thereby and is held gripped between the separator and the springs arms 50. Provision is made for the friction forces acting on the picture to be smaller on the side facing towards the separator than on the side facing away from it, so that the picture cannot be carried along by the separator. This can be achieved in various ways: the friction on the separator side can be reduced by suitable choice of material, or a rolling-action friction can be provided, and/or friction on the spring side can be increased by roughening, choice of material and so on. In the embodiment described, small teeth 52 are pushed out of the material of the spring, opposite which teeth the separator has a recess 86 so that it does not abrade against the teeth during the return travel of the slider member. A special retentive covering could also be provided as an alternative to these small teeth. In this embodiment the small teeth are arranged opposing the withdrawal direction of the slider member; on return of the slider member towards the end of the change-over operation the lowermost picture of the remainder of the pile does not come into contact with the small teeth in a manner likely to cause damage, in particular because of the fact that it is held at a distance by means of the ribs 58 and/or the bottom strips 34a.

The described gripping action is effective in this embodiment for approximately half of the slider member travel. It is obvious, however, that this method of gripping the separated picture could also be applied to the entire slider member travel. The friction-increasing features would then be applied also to the spring arms 72, wherein the spring assemblies could be of even simpler construction, namely in the form of a continuous band. In this embodiment, however, the spring arms 72 are run over by the runners 88 integrally moulded on the bottom strips 34a in order to depress these arms so that pictures that are to be inserted with the slider member only partially pulled out are not obstructed i.e. do not get beneath the springs (i.e. between the spring arms 72 and the housing floor).

Since, therefore, after about half the withdrawal travel the clamping action is no longer effective in this embodiment, the separated picture is kept under control in a different manner. Its end edge supported at the start of the change-over operation by the hooks now positions itself in front of the projections 56, because the separator bar 36 depresses the picture, assisted by the action of the spring arms 50 which lift the other edge of the picture. It should be noted that, in general, the pictures, when they are photographs, are not completely flat, but are bowed in an unpredictable manner. If a picture is supplied by the processing firm bowed in a U-shape, about an axis which runs transversely to the withdrawal direction of the slider member and is located on the window side of the picture, then there is a risk that the end edge of such a picture will lie not in front of the projections 56 but higher than these. As a precaution against this case, provision is made for ribs to extend along the floor in the withdrawal direction which cooperate with the separator bar 36 to bend the separated picture about at least one axis of curvature running approximately at right angles to the axis of curvature of the picture. The two directions of curvature cannot exist side by side so that the constrained deformation by the action of the ribs/separator prevails. In this embodiment the function of the ribs is assumed by the ribs 58, which extend right to the front to the ejection opening of the slider member. The separated picture therefore remains lying in front of the projections for the full withdrawal of the slider member.

As in the previously known picture changers, in this position of the slider member the separated picture is lifted by the spring arms 50/72/,27 in front of the window and thus in front of the stop members 90, so that it slides over the separator onto the pile on reinsertion of the slider member into the housing. The separator has a wedge-like face 96 which, as the separator slides onto the stepped portions 46, prevents these from being damaged in that they are pressed downwards against the bias of the spring arms 44. The change-over operation is thus concluded.

During the picture change operation there are several different retaining systems acting in succession on the picture to be separated, yet one system never releases the picture until it has been taken over by another. In the embodiment, the systems are allocated specific portions of the travel of the slider member movement, but these can also be divided up differently. In an extreme case, one system can be effective for the entire withdrawal travel of the slider member.

Each of the retaining systems acts preferably at two points on the picture in order to prevent twisting.

The embodiment can be modified, for example, in that instead of the pile, the individual picture is transported by the slider member out of the housing and/or the picture is removed at the window side of the pile instead of at the side farthest from the window.

FIG. 11 illustrates a variation in the construction of the spring arms 72. Here, at the free ends a mechanism is arranged which, after separation of the picture, engage over the edge thereof and carry it downwards when the runners run over the spring arms.

The mechanism comprises a hook 92 which is arranged on the spring arm such that it is displaceable longitudinally. Its position during the first phase of the change-over operation is indicated by a broken line. As the runner runs on, it is displaced into the position illustrated by solid lines, in which it snaps over the free edge of the picture and holds this firmly.

FIG. 12 shows a variation of this principle. The spring arm 72 (not illustrated) carries a rail 94 with an integrally formed detent stepped portion 96. At the free end of the rail a two-armed lever 100 is arranged to pivot about a pin 98; the lever is swivelled in the direction of the arrow by the remainder of the pile 102 pushed by means of the separator. On the other arm of the lever there is an angled member 104 which extends in the opposite direction to the direction of movement of the remainder of the pile 102 and in the rest position of the lever 100 lies protected behind the stepped portion 96 with a blade-like edge 108 facing the individual sheet or individual picture 106. When the lever 100 is pivoted, the blade-like edge engages the sheet 106, but can be run over by the separator bar if the latter is correspondingly recessed in the region of the rail. On the other hand, when the slider member is pushed back, the lever is displaced in the other direction until it is able to snap back into its position of rest shown in FIG. 12, into which it is biassed by means of a spring (not illustrated).

FIGS. 13 to 17 illustrate variations of the retaining means which keep the individual sheet in the housing. Unlike the first embodiment, in this case a pair of rails provided with teeth 120 is not held by spring bias in engagement with the individual sheet; on the contrary, the separator bar 36 has projections 122 which hold the individual sheet on withdrawal of the slider member (FIG. 13) in engagement with the teeth; it is apparent that in this case the toothed rails 124 assume the function of the ribs 56 of the first embodiment. FIG. 14 shows that the rails 124 can be recessed behind protective rails 126, for example in order to be able to remove the entire pile. For this purpose the two rails 124 are joined together by a cross-piece 128 to form a one-piece counter-element, which—compare FIG. 16—is displaceable relative to the floor 132 of the housing for a short distance in that it is shifted to the right (in FIG. 16) by means of the button 130 accessible from the outside. As this occurs, wedge-like faces 134, integrally moulded on the undersides of the rails 124, slide over stop projections 136 behind which they drop into recesses 138, whereby the rails too are retracted relative to the protective rails. A biassing spring 140 which is braced against a bridge 142 integrally moulded on the housing floor safeguards the respective end position of the counter-element. In the position of the toothed rails 124 in which these are retracted, as illustrated in FIG. 15, a free end of the spring 140 behind the bridge projects upwards and when the slider member is reinserted it presses against this end of the spring and displaces the counter-element into its functional position shown in FIG. 16.

FIG. 17 indicates that this displacement of the counter-element can also be performed on each rearrangement or change-over operation. The crosspiece 128 is extended on both sides beyond the rails 124 so that it can be pushed back by the slider member side pieces; at the other end the toothed rails 124 have lateral continuations 144 against which the corresponding control pins of the slider member (not illustrated) strike when the slider member approaches its outer end position. In this manner the teeth 120 are retracted on each return travel movement of the slider member and the lowermost sheet of the remainder of the pile need not slide over the teeth.

FIGS. 18 to 24 relate to a variation of the separating means with which the advantages described in the introduction are also achieved.

In these forms of embodiment, both separating elements are arranged on the first frame part, the housing, and both are displaceable relative to one another in a direction which has at least one component parallel to the direction of movement of the frame parts. In the embodiments, swivelling flaps 150 are pivotable about axes at right angles to the principal plane of the pile symmetrically with respect to a plane that runs at right angles to the principal plane of the pile in the direction of movement of the frame parts through the centre of the device. Only one of these flaps is shown in each of the Figures.

FIGS. 18 to 20 show a first example. The separating means comprises a support face 152 on the housing floor, a step 154 and a top face 156 parallel to the support face as first separating element, while the flaps form the second separating element.

The flaps stand initially transversely to the direction of movement of the frame parts parallel to the step 154. When the separator 36 runs on, it pivots the flaps into the position shown in FIG. 20 in which they pass through complementary recesses 158 in the separator. In so doing, they push the remainder of the pile in front of them while the individual sheet lies protected behind the step 154. When the separator has run completely over the flaps, they spring resiliently back into their initial position, a double-action spring 160 being provided for this purpose (FIG. 19), one leg pressing on the flap 150 and the other being braced against a projection 162. As the slider member returns, the flaps yield in the opposite direction as shown in FIG. 20 by a broken line.

In the embodiment shown in FIGS. 21 and 22 the flaps are not restored to their initial position by spring force, but remain at first on the individual sheet and hold it against the support (FIG. 22). Each flap is joined to a restoring lever 164 which, by way of a wire linkage system 166 with a compensating spring 168, pivots the flap back when the separator 36 runs onto a control extension 170 of the linkage system.

In the variation shown in FIGS. 23 and 24, each flap 150 has a basic L-shape with a working arm and a restoring lever 172. An extension 174 of the restoring arm is passed over by a recess 176 of the separator as the slider member is withdrawn and is then able to pivot behind the separator when this meets the working arm and carries it along. The remainder of the pile is moved along thereby, as before (the outline of the pile is shown by a dot-dash line), whilst the individual sheet remains lying protected behind the step. On the pivot pin 178 is an integrally moulded square 182, against the outer faces of which there lies a leaf spring 184 fastened at 186 in the housing floor; the flap therefore has two stable end positions between which it can move backwards and forwards.

It is obvious that details of the individual forms of embodiment are be combined with one another in the manner expressed in the patent claims.

I claim:

1. Device for the cyclic rearrangement of a pile of rectangular sheets, for example photographs, with a first (20) and a second (30) frame part which are movable backwards and forwards relative to one another and parallel to the principal plane of the pile, and with means which on movement of the frame parts backwards and forwards remove an individual sheet from one end of the pile and add said individual sheet to the other end of the pile again, which means comprise:

(a) a separating means (36, 46) for separating the individual sheet from the pile,
(b) a feeding means (66) for feeding sheets to the separating means,
(c) retaining means (50, 52, 56) for retaining the individual sheet in the first frame part and the remainder of the pile in the other frame part, and
(d) guide means for guiding the separated individual sheet for the purpose of returning said individual sheet to the other end of the remainder of the pile, wherein the separating means comprises a first (46) and a second (36) separating element which define a through-gap which for the entry of the sheet to be separated has an inside width of more than the thickness of one sheet and less than the thickness of two sheets, and wherein the two separating elements are biased resiliently towards one another only during an initial phase of the movement of the frame parts.

2. Device according to claim 1, in which the height of the through-gap is limited by a stepped portion (46) provided on one of the separating elements.

3. Device according to claim 2, in which the stepped portion (46) is provided on a resilient element.

4. Device according to claim 1, in which the separating means is symmetrical with respect to a plane of symmetry running at right angles to the principal plane of the pile and parallel to the direction of movement of the frame parts.

5. Device according to claim 4, in which a stepped portion (46) is provided on two sub-elements (44) biassed independently of one another.

6. Device according to claim 5, in which each stepped portion (46) is provided on a spring arm (44).

7. Device according to claim 6, in which the spring arms (44) extend transversely to the direction of movement of the frame parts.

8. Device according to claim 7, in which the height of the stepped portion is independent of the magnitude of the spring displacement during the gap formation.

9. Device according to claim 8, in which the stepped portions (46) have a rounded contour.

10. Device according to claim 6, in which the stepped portions (46) and the spring arms (66) are of integral construction.

11. Device according to claim 10, in which the stepped portions and the spring arms form a one-piece plastics part.

12. Device according to claim 1, in which one of the separating elements (36) forms the holder for the remainder of the pile, while the other separating element is arranged on a separate insert (40) in the first frame part and during the initial phase of the movement of the frame parts is resiliently biassed towards the one separating element.

13. Device according to claim 1, in which means are provided for deforming the individual sheet in such a manner that said individual sheet has curves which space the remainder of the pile from the through-gap.

14. Device according to claim 1, in which the separating elements for blocking the through-gap during that part of the frame part movement for which the feeding means is active are manually displaceable relative to one another.

15. Device according to claim 1, in which the individual sheet during at least a partial travel of the relative movement of the frame parts is brought by a separator bar, which holds the remainder of the pile, into contact with teeth arranged on a counter-element, which teeth hold the individual sheet, and wherein means are provided for preventing direct contact between the separator bar and the teeth.

16. Device according to claim 1, in which the retaining means for retaining the individual sheet comprises stop members (56) against which an edge of the individual sheet running transversely to the direction of the relative movement of the frame parts is positioned as the frame parts are moved apart, and in which means are provided for deforming the individual sheet in such a manner that its edge is positioned in front of the stop members for a least that part of the frame movement during which this edge should act against the stop members.

17. Device according to claim 1, in which the retaining means for holding the individual sheet comprises stop members against which an edge of the individual sheet running transversely to the direction of the relative movement of the frame parts acts as the frame parts are moved apart, and in which means (92) are provided which engage over the individual sheet edge and hold said edge in front of the stop members and, controlled by the relative movement of the frame parts, release said edge again.

18. Device according to claim 1, in which the two separating elements are arranged on the same frame part and are displaceable relative to one another in the direction of movement of the frame parts and controlled by this movement.

19. Device for the cyclic arrangement of a pile of rectangular sheets, for example photographs, with a first (20) and a second (30) frame part which are movable backwards and forwards relative to one another and parallel to the principal plane of the pile, and with means which on movement of the frame parts backwards and forwards remove an individual sheet from one end of the pile and add said individual sheet to the other end of the pile again, which means comprise:
(a) a separating means (36, 46) for separating the individual sheet from the pile,
(b) a feeding means (66) for feeding sheets to the separating means,
(c) retaining means (50, 52, 56) for retaining the individual sheet in the first frame part and the remainder of the pile in the other frame part, and
(d) guide means for guiding the separated individual sheet for the purpose of returning said individual sheet to the other end of the remainder of the pile, wherein the separating means comprises a first (46) and a second (36) separating element which define a through-gap which for the entry of the sheet to be separated has an inside width of more than the thickness of one sheet and less than the thickness of two sheets, and in which one of the separating elements (36) forms the holder for the remainder of the pile while the other separating element is arranged on a separate insert (40) in the first frame part, and is biased resiliently towards the one separating element only during the initial phase of the movement of the frame parts.

20. Device according to claim 19, in which the height of the through-gap is defined by a stepped portion (46) provided on one of the separating elements.

21. Device according to claim 20, in which the stepped portion (46) is provided on a resilient element.

22. Device according to claim 19, in which the separating means is symmetrical with respect to a plane of symmetry extending at right angles to the principal plane of the pile and parallel to the direction of movement of the frame parts.

23. Device according to claim 22, in which a stepped portion (46) is provided on two sub-elements (44) biassed resiliently independently of one another.

24. Device according to claim 23, in which each stepped portion (46) is provided on a spring arm (44).

25. Device according to claim 24, in which the spring arms (44) extend transversely to the direction of movement of the frame parts.

26. Device according to claim 25, in which the height of the stepped portion is independent of the magnitude of the spring displacement during the formation of the gap.

27. Device according to claim 26, in which the stepped portions (46) have a rounded contour.

28. Device according to claim 24, in which the stepped portions (46) and the spring arms (44) are of integral construction.

29. Device according to claim 28, in which the stepped portions and the spring arms form a one-piece plastics part.

30. Device according to claim 19, in which means for deforming the individual sheet are provided in such a manner that the sheet has curves which space the remainder of the pile from the through-gap.

31. Device according to claim 19, in which the separating elements for blocking the through-gap during that part of the movement of the frame parts for which the feeding means is active are manually displaceable relative to one another.

32. Device according to claim 19, in which the individual sheet during at least a partial travel of the relative movement of the frame parts is brought by a separator bar, which holds the remainder of the pile, into contact with teeth arranged on a counter element, which teeth hold the individual sheet, and wherein means are provided for preventing direct contact between the separator bar and the teeth.

33. Device according to claim 19, in which the retaining means for retaining the individual sheet comprises stop members (56) against which an edge of the individual sheet running transversely to the direction of the relative movement of the frame parts acts as the frame parts are moved apart, and in which means are provided for deforming the individual sheet in such a manner that its edge is positioned in front of the stop members for at least that partial travel of the frame parts during which this edge should act against the stop members.

34. Device according to claim 19, in which the retaining means for holding the individual sheet comprises stop members against which an edge of the individual sheet running transversely to the direction of the relative movement of the frame parts acts as the frame parts are moved apart, and in which means (92) are provided which engage over the individual sheet edge and hold said edge in front of the stop members and, controlled by the relative movement of the frame parts, release said edge again.

35. Device according to claim 19, in which the two separating elements are arranged on the same frame part and are displaceable relative to one another in the direction of the frame part movement and controlled by this movement.

36. Device for the cyclic rearrangement of a pile of rectangular sheets, for example photographs, with a first (20) and a second (3) frame part which are movable backwards and forwards relative to one another and parallel to the principal plane of the pile, and with means which on movement of the frame parts backwards and forwards remove an individual sheet from one end of the pile and add said individual sheet to the other end of the pile again, which means comprise:
(a) a separating means (36, 46) for separating the individual sheet from the pile, said separating means comprising a first and a second separating element which define a through-gap,
(b) a feeding means (66) for feeding sheets to the separating means,
(c) retaining means (50, 52, 56) for retaining the individual sheet in the first frame part and the remainder of the pile in the other frame part, and
(d) guide means for guiding the separated individual sheet for the purpose of the remainder of the pile,
in which means for deforming the individual sheet are provided in such a manner that the sheet has curves which space the remainder of the pile from the through-gap.

37. Device according to claim 36, in which the means for deforming the individual sheet are constructed in such a manner that the sheet has curves running in the direction of movement of the frame parts.

38. Device according to claim 36, in which the means for deforming the individual sheet are effective after entry of the individual sheet into a through-gap formed by the separating means.

39. Device according to claim 38, in which the remainder of the pile, when not engaged by the feeding means, is spaced from the through-gap.

40. Device according to claim 36, in which the deformation means comprise recesses and projections on the frame parts which engage one another in a comb-like manner.

41. Device according to claim 40 wherein said projections and recesses of one of the frame parts are provided on the separating element arranged in said one frame part.

42. Device according to claim 41, in which the projections of the other frame part are constructed as ribs which extend in the direction of movement of the frame parts.

43. Device according to claim 42, in which the ribs are located in the region outside a through-gap for the individual sheet defined by the separating means.

44. Device according to claim 36, in which the individual sheet is stiffened by the curves in the direction in which the frame parts move.

45. Device according to claim 36, in which the separating means comprises a first and a second separating element which define a through-gap which, for the entry of the sheet to be separated, has an inside width of more than the thickness of one sheet and less than the thickness of two sheets, and in which the two separating elements are biassed resiliently towards one another only during an initial phase of the movement of the frame parts.

46. Device according to claim 36, in which the separating elements for blocking the through-gap during that part of the frame part movement for which the feeding means is active are manually displaceable relative to one another.

47. Device according to claim 36, in which the individual sheet during at least a partial travel of the relative movement of the frame parts is brought by a separator bar, which holds the remainder of the pile, into contact with teeth arranged on a counter-element which teeth hold the individual sheet, and wherein means are provided for preventing direct contact between the separator bar and the teeth.

48. Device according to claim 36, in which the retaining means for retaining the individual sheet comprises stop members (56) against which an edge of the individual sheet running transversely to the direction of the relative movement of the frame parts acts as the frame parts are moved apart, and in which means are provided for deforming the individual sheet in such a manner that its edge is positioned in front of the stop members for a least that partial travel of the frame movement during which this edge should act against the stop members.

49. Device according to claim 36, in which the retaining means for holding the individual sheet comprises stop members against which an edge of the individual sheet running transversely to the direction of the relative movement of the frame parts acts as the frame parts are moved apart, and in which means (92) are provided which engage over the individual sheet edge and hold said edge in front of the stop members and, controlled by the relative movement of the frame parts, release said edge again.

50. Device according to claim 36, in which the two separating elements are arranged on the same frame part and are displaceable relative to one another in the direction of the frame part movement and controlled by this movement.

51. Device for the cyclic rearrangement of a pile of rectangular sheets, for example photographs, with a first (20) and a second (30) frame part which are movable backwards and forwards relative to one another and parallel to the principal plane of the pile, and with means which on movement of the frame parts backwards and forwards remove an individual sheet from one end of the pile and add said individual sheet to the other end of the pile again, which means comprise:
 (a) a separating means (36, 46) for separating the individual sheet from the pile,
 (b) a feeding means (66) for feeding sheets to the separating means,
 (c) retaining means (50, 52, 56) for retaining the individual sheet in the first frame part and the remainder of the pile in the other frame part, and
 (d) guide means for guiding the separated individual sheet for the purpose of returning said individual sheet to the other end of the remainder of the pile,
wherein the separating means comprises a first (46) and a second (36) separating element which define a through-gap, and in which the separating elements for blocking the through-gap during that part of the movement of the frame parts for which the feeding means is active are manually displaceable relative to one another by means of a manual operator movably connected to one of said frame parts.

52. Device according to claim 51, in which the displaceable separating element can be returned to its initial position by the other separating element.

53. Device according to claim 51 with a separating element displaceable by sliding.

54. Device according to claim 51, in which the displaceable separating element can be locked to the frame part in which said displaceable separating element is arranged.

55. Device according to claim 54, in which the displaceable separating element is constructed to lock itself when displaced back to its original position.

56. Device according to claim 51, in which the displaceable separating element is resiliently deformable at least in some parts.

57. Device according to claim 56, in which the displaceable separating element is resiliently biassed towards the other separating element.

58. Device according to claim 51, in which the through-gap has a height which is greater than the thickness of one sheet and less than that of two sheets, and wherein the two separating element are biassed towards one another only during an initial phase of the movement of the frame parts.

59. Device according to claim 51, in which one of the separating elements (36) forms the holder for the remainder of the pile, while the other separating element is arranged on a separate insert (40) in the first frame part and during the initial phase of the movement of the frame parts is resiliently biassed towards the one separating element.

60. Device according to claim 51, in which means are provided for deforming the individual sheet in such a manner that said individual sheet has curves which space the remainder of the pile from the through-gap.

61. Device according to claim 51, in which the separating elements for blocking the through-gap during that part of the frame part movement for which the feeding means is active are manually displaceable relative to one another.

62. Device according to claim 51, in which the individual sheet during at least a partial travel of the relative movement of the frame parts is brought by a separator bar, which holds the remainder of the pile, into contact with teeth arranged on a counter-element, which teeth hold the individual sheet, and wherein means are provided for preventing direct contact between the separator bar and the teeth.

63. Device according to claim 51, in which the retaining means for retaining the individual sheet comprises stop members (56) against which an edge of the individual sheet running transversely to the direction of the relative movement of the frame parts acts as the frame parts are moved apart, and in which means are provided for deforming the individual sheet in such a manner that its edge is positioned in front of the stop members for a least that part of the frame movement during which this edge should act against the stop members.

64. Device according to claim 51, in which the retaining means for holding the individual sheet comprises stop members against which an edge of the individual sheet running transversely to the direction of the relative movement of the frame parts acts as the frame parts are moved apart, and in which means (92) are provided which engage over the individual sheet edge and hold said edge in front of the stop members and, controlled by the relative movement of the frame parts, release said edge again.

65. Device according to claim 51, in which the two separating elements are arranged on the same frame part and are displaceable relative to one another in the direction of movement of the frame parts and controlled by this movement.

66. Device for the cyclic rearrangement of a pile of rectangular sheets, for example photographs, with a first (20) and a second (30) frame part which are movable backwards and forwards relative to one another and parallel to the principal plane of the pile, and with means which on movement of the frame parts backwards and forwards remove an individual sheet from one end of the pile and add said individual sheet to the other end of the pile again, which means comprises:
(a) a separating means (36, 46) for separating the individual sheet from the pile,
(b) a feeding means (66) for feeding sheets to the separating means,
(c) retaining means (50, 52, 56) for retaining the individual sheet in the first frame part and the remainder of the pile in the other frame part, and
(d) guide means for guiding the separated individual sheet for the purpose of returning said individual sheet to the other end of the remainder of the pile, in which the individual sheet during at least a partial travel of the relative movement of the frame parts is brought by a separator bar, which holds the remainder of the pile, into contact with teeth arranged on a counter-element, which teeth hold the individual sheet, and wherein means are provided for preventing direct contact between the separator bar and the teeth.

67. Device according to claim 66, in which the teeth can be disengaged from the individual sheet as the frame parts are pushed together.

68. Device according to claim 67, in which the teeth oppose the movement of the frame parts away from each other.

69. Device according to claim 67, in which the teeth can be spaced relative to the individual sheet.

70. Device according to claim 69, in which the spacing can be carried out manually.

71. Device according to claim 70, in which the counter-element is accessible from outside the device.

72. Device according to claim 67, in which a distance spacing said teeth from said individual sheet is controlled by the movement of the frame parts.

73. Device according to claim 66, in which, in the region of the teeth, the separator bar has recesses and laterally of these has projections which hold the individual sheet against the teeth.

74. Device according to claim 73, in which, the separator bar recesses have a rounded contour.

75. Device according to claim 66, in which the teeth lie under spring bias against the individual sheet.

76. Device according to claim 75 with a pressing system for pressing the pile against a viewing window arranged in one of the frame parts, wherein the teeth are arranged on the pressing system for the pile.

77. Device according to claim 75, in which the teeth are pushed out of a leaf spring.

78. Device according to claim 66, in which the counter-element is arranged on the floor of one of the frame parts.

79. Device according to claim 66, in which the teeth are constructed on at least one edge of the counter-element.

80. Device according to claim 66, in which the teeth are arranged symmetrically with respect to a plane of symmetry running at right angles to the principal plane of the pile and in the direction of movement of the frame parts.

81. Device according to claim 80 with two rows of teeth which extend parallel to the direction of movement of the frame parts.

82. Device according to claim 80, in which the counter-element has a U-shaped basic outline with the teeth on the free arms.

83. Device according to claim 82, in which the base of the U is manually operable from the outside for displacing the counter-element into a position in which the teeth are disengaged from the individual sheet.

84. Device according to claim 66, in which the separating means comprises a first (46) and a second (36) separating element which define a through-gap which, for the entry of the sheet to be separated, has an inside width of more than the thickness of one sheet and less than the thickness of two sheets, and wherein the two separating elements are biassed resiliently towards one another only during an initial phase of the movement of the frame parts.

85. Device according to claim 66, in which one of said separating means (36) forms the holder for the remainder of the pile, while the other separating means is arranged on a separate insert (40) in the first frame part and during the initial phase of the movement of the frame parts is resiliently biassed towards the one separating means.

86. Device according to claim 66, in which means are provided for deforming the individual sheet in such a manner that said individual sheet has curves which space the remainder of the pile from the through-gap.

87. Device according to claim 66, in which the separating means for blocking a through-gap during that part of the frame part movement for which the feeding means is active are manually displaceable relative to one another.

88. Device according to claim 66, in which the retaining means for retaining the individual sheet comprises stop members (56) against which an edge of the individual sheet running transversely to the direction of the relative movement of the frame parts acts as the frame parts are moved apart, and in which means are provided for deforming the individual sheet in such a manner that its edge is positioned in front of the stop members for a least that partial travel of the frame movement during which this edge should act against the stop members.

89. Device according to claim 66, in which the retaining means for holding the individual sheet comprises stop members against which an edge of the individual sheet running transversely to the direction of the relative movement of the frame parts acts as the frame parts are moved apart, and in which means (92) are provided which engage over the individual sheet edge and hold said edge in front of the stop members and, controlled by the relative movement of the frame parts, release said edge again.

90. Device according to claim 66, in which the two separating elements are arranged on the same frame part and are displaceable relative to one another in the direction of movement of the frame parts and controlled by this movement.

91. Device for the cyclic rearrangement of a pile of rectangular sheets, for example photographs, with a first (20) and a second (30) frame part which are movable backwards and forwards relative to one another and parallel to the principal plane of the pile, and with means which on movement of the frame parts backwards and forwards remove an individual sheet from one end of the pile and add said individual sheet to the other end of the pile again, which means comprise:
(a) a separating means (36, 46) for separating the individual sheet from the pile,
(b) a feeding means (66) for feeding sheets to the separating means,
(c) retaining means (50, 52, 56) for retaining the individual sheet in the first frame part and the remainder of the pile in the other frame parts, and (d) guide means for guiding the separated individual sheet for the purpose of returning said individual sheet to the other end of the remainder of the pile, and in which the retaining means for retaining the individual sheet comprises stop members (56) against which an edge of the individual sheet running transversely to the direction of the relative movement of the frame parts acts as the frame parts are moved apart, and in which means are provided for deforming the individual sheet in such a manner that its edge is positioned in front of the stop members for a least that partial travel of the frame movement during which this edge should act against the stop members.

92. Device according to claim 91, in which the deformation means are constructed for a corrugated deformation of the individual sheet.

93. Device according to claim 92, in which the deformation means comprise projections and recesses on both frame parts which engage each other in a comb-like manner.

94. Device according to claim 93, in which the projections and recesses of one of the frame parts are provided on the separating element thereof.

95. Device according to claim 94, in which the projections of the other frame part are constructed as ribs which extend in the direction of the relative movement of the frame parts.

96. Device according to claim 95, in which the ribs extend for the greatest part of the travel of the relative movement.

97. Device according to claim 91, in which the stop members are arranged fixedly in the first frame part.

98. Device according to claim 91, in which a pressing arrangement is provided which presses the pile towards a viewing window arranged in one of the frame parts, and wherein the stop members form a part of the pressing arrangement.

99. Device according to claim 91, in which the stop members form a part of the feeding means.

100. Device according to claim 91, in which the separating means comprises a first (46) and a second (36) separating element which define a through-gap which, for the entry of the sheet to be separated, has an inside width of more than the thickness of one sheet and less than the thickness of two sheets, and wherein the two separating elements are biassed resiliently towards one another only during an initial phase of the movement of the frame parts.

101. Device according to claim 91, in which one of the separating means (36) forms the holder for the remainder of the pile, while the other separating means is arranged on a separate insert (40) in the first frame part and during the initial phase of the movement of separating means.

102. Device according to claim 91, in which means are provided for deforming the individual sheet in such a manner that said individual sheet has curves which space the remainder of the pile from a through-gap.

103. Device according to claim 91, in which the separating means for blocking a through-gap during that part of the frame part movement for which the feeding means is active are manually displaceable relative to one another.

104. Device according to claim 91, in which the individual sheet, during at least a partial travel of the relative movement of the frame parts, is brought by a separator bar, which holds the remainder of the pile, into contact with teeth arranged on a counter-element which teeth hold the individual sheet, and wherein means are provided for preventing direct contact between the separator bar and the teeth.

105. Device according to claim 91, in which the two separating elements are arranged on the same frame part and are displaceable relative to one another in the direction of movement of the frame parts and controlled by this movement.

106. Device for the cyclic rearrangement of a pile of rectangular sheets, for example photographs, with a first (20) and a second (30) frame part which are movable backwards and forwards relative to one another and parallel to the principal plane of the pile, and with means which on movement of the frame parts backwards and forwards remove an individual sheet from one end of the pile and add said individual sheet to the other end of the pile again, which means comprise:

(a) a separating means (36, 46) for separating the individual sheet from the pile,
(b) a feeding means (66) for feeding sheets to the separating means,
(c) retaining means (50, 52, 56) for retaining the individual sheet in the first frame part and the remainder of the pile in the other frame part, and
(d) guide means for guiding the separated individual sheet for the purpose of returning said individual sheet to the other end of the remainder of the pile, and in which the retaining means for retaining the individual sheet comprises stop members against which an edge of the individual sheet running transversely to the direction of the relative movement of the frame parts acts as the frame parts are moved apart, and in which there are provided means (92) which engage over the individual sheet and hold said individual sheet in front of the stop members and, controlled by the relative movement of the frame parts, release said individual sheet again.

107. Device according to claim 106, in which a pressing arrangement is provided which presses the pile towards a viewing window arranged in one of the frame parts, and wherein the stop members form a part of the pressing arrangement.

108. Device according to claim 106, in which the means engaging the sheet and the individual sheet are displaceable relative to one another in the direction of movement of the frame parts between a retaining position and a releasing position.

109. Device according to claim 108, in which the engaging means are displaceable relative to the stop members and the individual sheet.

110. Device according to claim 106, in which the stop members form a part of the feeding means.

111. Device according to claim 110, in which the means engaging the sheet are displaceable relative to the pressing arrangement in the direction of movement of the frame parts between a retaining position and a releasing position.

112. Device according to claim 110, in which the means engaging the sheet are displaceable in the direction of movement of the frame parts between a retaining position and a releasing position relative to the feeding means.

113. Device according to claim 106, in which the engaging means are constructed as hooks (92).

114. Device according to claim 106, in which the stop members and the engaging means are arranged symmetrically with respect to an axis of symmetry running at right angles to the principal plane of the pile and parallel to the direction of movement of the frame parts.

115. Device according to claim 106, in which the engaging means are displaceable approximately at the reversal point of the movement of the frame parts into a release position.

116. Device according to claim 106, in which the stop members and the engaging means with the edge of the individual sheet held by them are constrained during the rearrangement to move substantially at right angles to the principal plane of the pile.

117. Device according to claim 106, in which the separating means comprises a first (46) and a second (36) separating element which define a through-gap which, for the entry of the sheet to be separated, has an inside width of more than the thickness of one sheet and less than the thickness of two sheets, and wherein the two separating elements are biassed resiliently towards one another only during an initial phase of the movement of the frame parts.

118. Device according to claim 106, in which a first separating means (36) forms the holder for the remainder of the pile, while a second separating means is arranged on a separate insert (40) in the first frame part and during the initial phase of the movement of the frame parts is resiliently biassed towards the first separating means.

119. Device according to claim 106, in which means are provided for deforming the individual sheet in such a manner that said individual sheet has curves which space the remainder of the pile from the through-gap.

120. Device according to claim 106, in which the separating means for blocking a through-gap during that part of the frame part movement for which the feeding means is active are manually displaceable relative to one another.

121. Device according to claim 106, in which the individual sheet during at least a partial travel of the relative movement of the frame parts is brought by a separator bar, which holds the remainder of the pile, into contact with teeth arranged on a counter-element which teeth hold the individual sheet, and wherein means are provided for preventing direct contact between the separator bar and the teeth.

122. Device according to claim 106, in which the two separating elements are arranged on the same frame part and are displaceable relative to one another in the direction of movement of the frame parts and controlled by this movement.

123. Device according to claim 106, in which the engaging means can be inserted between the individual sheet and the remainder of the pile as soon as the individual sheet has been displaced with respect to the remainder of the pile for a predetermined distance by means of the movement of the frame parts.

124. Device according to claim 123, in which the engaging means are mechanically de-actuable by the remainder of the pile.

125. Device according to claim 123, in which the engaging means press the sheet of the remainder of the pile facing the individual sheet away from the individual sheet during the insertion.

126. Device for the cyclic rearrangement of a pile of rectangular sheets, for example photographs, with a first (20) and a second (30) frame part which are movable backwards and forwards relative to one another and parallel to the principal plane of the pile, and with means which on movement of the frame parts backwards and forwards remove an individual sheet from one end of the pile and add said individual sheet to the other end of the pile again, which means comprise:
(a) a separating means (36, 46) for separating the individual sheet from the pile,
(b) a feeding means (66) for feeding sheets to the separating means,
(c) retaining means (50, 52, 56) for retaining the individual sheet in the first frame part and the remainder of the pile in the other frame part, and
(d) guide, means for guiding the separated individual sheet for the purpose of returning said individual sheet to the other end of the remainder of the pile, wherein the separating means comprises a first and a second separating element which define a through-gap which, for the entry of the sheet to be separated, has a height of more than the thickness of one sheet and less than the thickness of two sheets, and in which the two separating elements are arranged on the same frame part and are displaceable relative to one another in the direction of movement of the frame parts and controlled by this movement.

127. Device according to claim 126, in which one of the separating elements comprises:
a support for supporting at least the edge of the individual sheet facing the through-gap,
a step defining the gap height, and
a contact face on the top side of the step farthest away from the individual sheet edge, and in which the other separating element is displaceable along the top face towards the step and over this.

128. Device according to claim 127, in which the one separating element is arranged fixedly in the frame part.

129. Device according to claim 127, in which the other separating element has wedge-like faces on its side facing the top face.

130. Device according to claim 127, in which the support and the top face are defined by substantially level flat portions parallel to one another.

131. Device according to claim 126, in which the separating elements are arranged on the first frame part.

132. Device according to claim 126, in which the displaceable separating element is pivotable with a moving component in the direction of movement of the frame parts.

133. Device according to claim 132, in which two substantially mirror-symmetrically arranged, displaceable separating elements are provided.

134. Device according to claim 133, in which the displaceable separating elements are pivotable about bearings arranged laterally with respect to the pile.

135. Device according to claim 134, in which the displaceable separating elements are pivotable about axes which extend substantially at right angles to the principal plane of the pile.

136. Device according to claim 135, in which the displaceable separating elements are arranged on the first frame part and the second frame part has control members which pivot the separating elements as they run on.

137. Device according to claim 136, in which the displaceable separating elements are displaceable between a resting position, in which they extend substantially parallel to the through-gap, and a pivoted-out position, in which they extend substantially parallel to the direction of movement of the frame parts.

138. Device according to claim 137, in which the displaceable separating elements are constrained to move by the control members between the two positions.

139. Device according to claim 136, in which the displaceable separating elements can be pivoted by the control members from the resting position into the extended position, and can be returned by spring force into their resting position.

140. Device according to claim 140, in which the displaceable separating elements are pivotable between a resting position, in which they extend substantially parallel to the through-gap, and a holding position, in which they hold the individual sheet against a support.

141. Device according to claim 140, in which the displaceable separating elements are pivotable by the control members at the start of the movement of the frame parts from the resting position into the holding position and can be returned to the resting position close to the reversal point of the movement of the frame parts.

142. Device according to claim 141, in which a releasing device actuated by the second frame part is provided for returning the displaceable separating elements.

143. Device according to claim 126, in which the two separating elements are resiliently biassed towards one another only during an initial phase of the movement of the frame parts.

144. Device according to claim 126, in which one of the separating elements is arranged on a separate insert in the first frame part.

145. Device according to claim 126, in which means are provided for deforming the individual sheet in such a manner that the sheet has curves which space the remainder of the pile from the through-gap.

146. Device according to claim 126, in which the separating elements for blocking the through-gap during that part of the frame part movement for which the feeding means is active are manually displaceable relative to one another.

147. Device according to claim 126, in which the individual sheet during at least a partial travel of the relative movement of the frame parts is brought by a separator bar, which holds the remainder of the pile, into contact with teeth arranged on a counter-element which teeth hold the individual sheet, and wherein means are provided for preventing direct contact between the separator bar and the teeth.

148. Device according to claim 126, in which the retaining means for retaining the individual sheet comprises stop members (56) against which an edge of the individual sheet running transversely to the direction of the relative movement of the frame parts acts as the frame parts are moved apart, and in which there are provided means for deforming the individual sheet in such a manner that its edge is positioned in front of the stop members for at least that partial travel of the movement of the frame parts for which this edge should be acting against the stop members.

149. Device according to claim 126, in which the retaining means for retaining the individual sheet comprises stop members against which an edge of the individual sheet running transversely to the direction of the relative movement of the frame parts acts as the frame parts are moved apart, and in which there are provided means which engage the individual sheet and hold it in front of the stop members and, controlled by the relative movement of the frame parts, release it again.

* * * * *